United States Patent [19]

Smallridge

[11] Patent Number: 5,092,646
[45] Date of Patent: Mar. 3, 1992

[54] DOUBLE CAPSTAN WINCH DRIVE

[76] Inventor: Bruce B. Smallridge, 565 Belvedere St., San Francisco, Calif. 94117

[21] Appl. No.: 368,736

[22] Filed: Jun. 20, 1989

[51] Int. Cl.⁵ .............................................. B25J 15/10
[52] U.S. Cl. ..................................... 294/111; 74/479; 254/278; 414/729; 623/24; 623/64; 901/21; 901/38
[58] Field of Search ...................... 414/729, 7; 901/21, 901/36, 38; 294/106, 111; 623/62, 64, 24; 254/278, 281; 74/479

[56] References Cited

U.S. PATENT DOCUMENTS

| | | |
|---|---|---|
| 3,717,325 | 2/1973 | Peterson . |
| 3,776,519 | 12/1973 | Hamilton . |
| 3,874,246 | 4/1975 | Woodard . |
| 3,881,369 | 5/1975 | Looney ........................ 74/89.22 X |
| 3,910,130 | 10/1975 | Traughber, Jr. . |
| 3,967,321 | 7/1976 | Ryan et al. ......................... 623/24 |
| 4,030,569 | 6/1977 | Berkovitz . |
| 4,074,444 | 2/1978 | Laenger, Sr. et al. . |
| 4,133,359 | 1/1979 | Jensen et al. . |
| 4,198,871 | 4/1980 | Dunn et al. . |
| 4,236,696 | 12/1980 | Hicks et al. . |
| 4,291,527 | 9/1981 | Allard . |
| 4,351,197 | 9/1982 | Carson . |
| 4,368,647 | 1/1983 | Sakaguci . |
| 4,399,979 | 8/1983 | Adelman . |
| 4,401,406 | 8/1983 | Rovira . |
| 4,406,420 | 9/1983 | Villano . |
| 4,482,133 | 11/1984 | Bishop . |
| 4,513,952 | 4/1985 | Vandelinde . |
| 4,526,050 | 7/1985 | Johnson . |
| 4,566,561 | 1/1986 | Atkey . |
| 4,575,050 | 3/1986 | Bechmann . |
| 4,620,615 | 11/1986 | Morris et al. . |
| 4,634,102 | 1/1987 | Appling et al. . |
| 4,635,875 | 1/1987 | Apple . |
| 4,651,974 | 3/1987 | Frommherz . |
| 4,653,948 | 3/1987 | Ikeda . |
| 4,666,128 | 5/1987 | Bechmann . |
| 4,715,583 | 12/1987 | Grützer . |
| 4,721,285 | 1/1988 | McMichael . |

Primary Examiner—Robert J. Spar
Assistant Examiner—Donald W. Underwood
Attorney, Agent, or Firm—Townsend and Townsend

[57] ABSTRACT

An improved double capstan drive allows mechanical amplification for increased power output from stepper motors, servo motors, and other control devices. Tensile members are attached to loads, wrapped around two continuously driven capstan drums, and attach to the stepper motors. The stepper motors, when energized, supply tailing forces to the tensile members which then engage frictionally on the capstan drums. Amplification of forces is achieved. Each wrap provides for slightly less than 2 times amplification of the tailing force with no upper limit to the number of wraps. Elastic bands attach to each wrap of the tensile members approximately midway between the two drums to provide for immediate and responsive release when stepper motors deenergize or reverse direction. Grooves or rings on the periphery of the drums provide tracks for wrapping the tensile member. An embodiment of the present device is used for immediately responsive control of a plurality of articulated digits comprising an analog of a human hand. The amplified tailing forces drive independently selectable digits towards and to a closed contracted position. The improved drive permits multiple tensile members to be driven simultaneously and held in desired positions, without affecting other digits manipulated by the same drive. The mechanical hand can be used as a robotic gripping device or as a fingerspelling device for use by the deaf-blind.

15 Claims, 2 Drawing Sheets

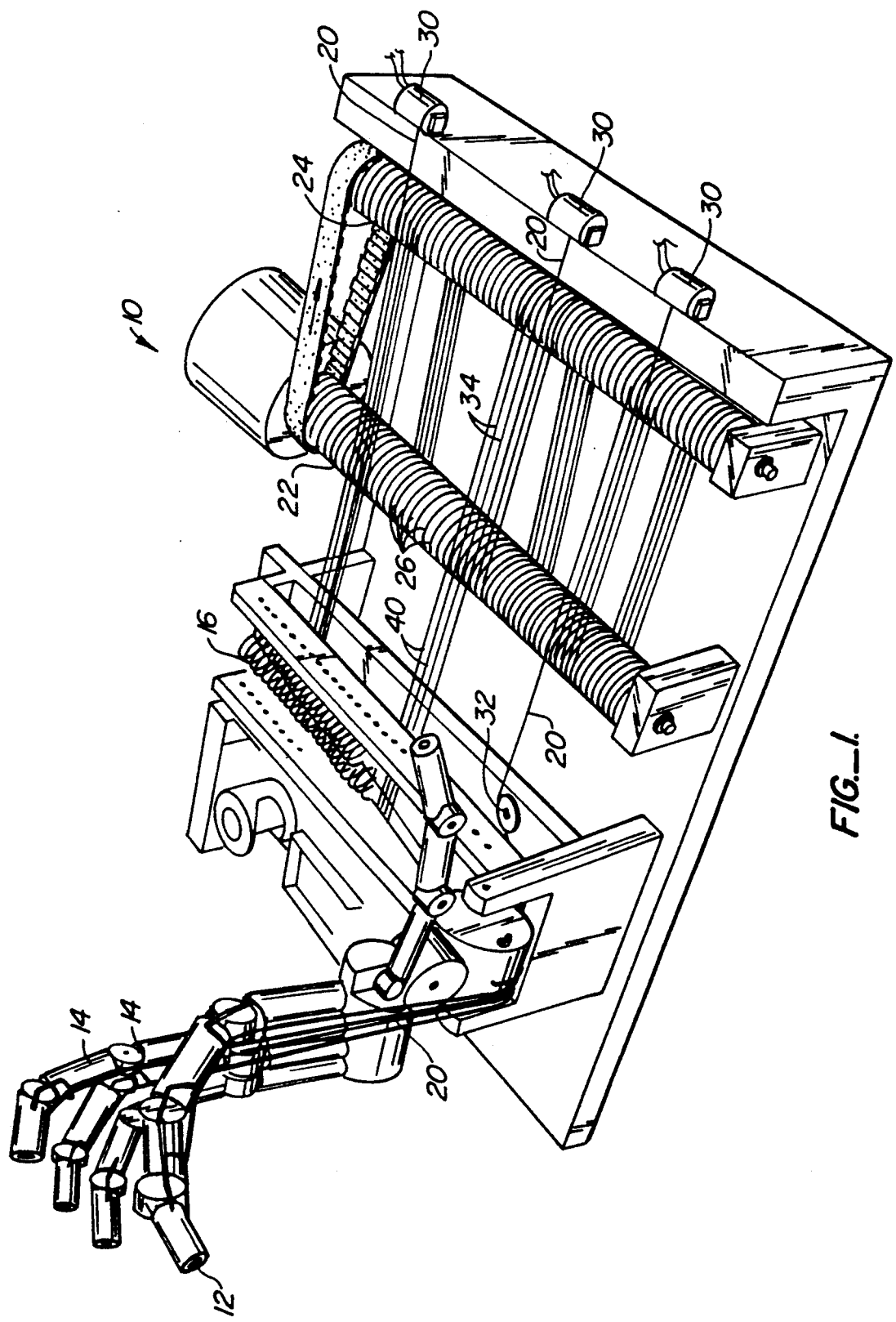
FIG._1.

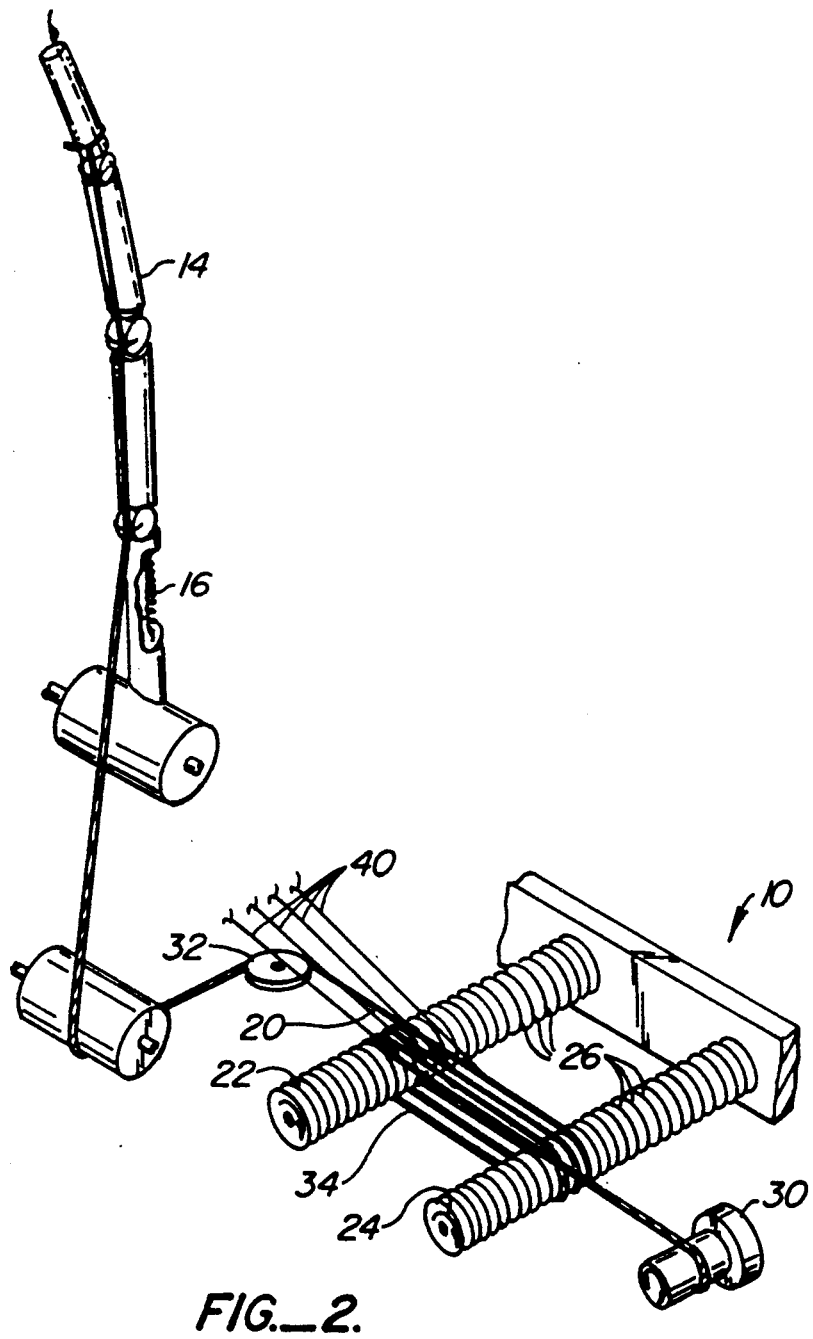
FIG._2.
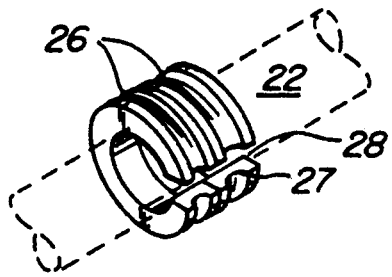
FIG._3.

DOUBLE CAPSTAN WINCH DRIVE

BACKGROUND OF THE INVENTION

This invention relates generally to an improved capstan drive apparatus for applying tensile force to a load. More particularly, the invention relates to an improved drive winch useful in robotics and automation for the manipulation of tensile members coupled to articulated members representative of digits of a human hand. The capstan drive has a double drive drum assembly intermediate between the plurality of digits and a means for applying a tailing force to a tensile member wrapped upon the capstan drive, to amplify the tailing force to manipulate a digit.

SUMMARY OF THE PRIOR ART

Double drum capstan winches, wherein two drive drums are used to apply a tensile force to a load, are known in the art. These prior art winches have a problem as a result of two inherent countervailing interests. The first is that adequate amplification of a tailing force to a rope wrapped about the capstan drive apparatus is accomplished by putting a plurality of wraps of the rope about the double drum device. As is known, the more wraps placed around the capstan winch, the greater the amplification of the tailing force which may be applied to the load. However, if there are more than three wraps of the rope about the capstan winch apparatus, it becomes difficult to relax the tensile force applied to the load. That is, a relatively large force in opposition to the tensile force must be applied to the load to relax the rope off of the capstan drive apparatus. One solution which has been used in the prior art, is the reversal of the drive drums in cooperation with a reduction of the tensile force, to permit the tensile member to relax the load.

In the field of robotics, which requires the manipulation of a great many of tensile members coupled to articulated appendages, limbs, and digits, special and particularized problems exist. A problem in robotics is to efficiently and economically use relatively large and bulky drive apparatus to manipulate multiple tensile members off of a single drive.

In the field of automation, many robotic manipulations are made by the use of pneumatic cylinders, for example, as a driving apparatus. These cylinders tend to be noisy and do not readily permit precise positioning of a load under control of the driving apparatus.

Human hand analogs are known in the art of robotics. Generally, the analog model is an opposition device, in that springs typically bias the hand in an open and extended position. It is known to apply a force in opposition to the spring bias to close and contract a digit to be manipulated. A removal or diminishment of the opposition force allows the spring biasing of a digit to open and extend the digits once again. It is known to provide tensile members threaded to said digits to couple an opposing force to selected digits.

Tensile members for robotic use in the prior art may be comprised of many materials. Examples include monofilament and braided nylon. A known factor in determining the type of tensile member material is the radius through which the tensile member may be turned without stress. Note should be made that many prior art capstan winches use steel rope as the tensile member.

SUMMARY OF THE INVENTION

The present device is, simply stated, a mechanical amplifier. An embodiment of the present device is used for immediately responsive control of a plurality of articulated digits comprising an analog of a human hand. An improved double drum capstan drive apparatus is used to provide amplification of a plurality of tailing forces applied to tensile members coupled to the articulated digits which are continuously biased in an open and extended position. The reader will appreciate that throughout this disclosure, the terms "winch" and "capstan drive" are intended to be used interchangeably and that a generic description of such device is to be included within the term "capstan winch."

The amplified tailing forces drive independently selectable digits towards and to a closed and contracted position. The improved drive permits multiple tensile members to be driven simultaneously and held in desired positions, without affecting other digits manipulated by the same drive.

The improved drive permits immediate movement of a selected digit towards and to the open and extended position upon the diminishment of the tailing force. Again, the movement of a selected digit may be independent of any other digit coupled to the capstan drive.

Two substantially parallel continuously rotating drive drums are provided having peripheral tracks parallel to one another. The drive drums each rotate in the same direction, at the same speed, and are separated by at least one diameter. The separation of the drive drums, in the present specific embodiment, is directly related to a stroke length desired for said load.

The articulated digits each have a tensile member threaded to it and wrapped around the capstan drive in a particular manner. Thus, multiple tensile members are wrapped about the capstan drive drum. A tensile member is directed to the capstan drive perpendicular to an axis of rotation of a drive drum. The tensile member is taken past a first drum, wrapped one half turn in the direction of rotation of a second drum. Then, the tensile member is returned to the first drum to be wrapped one half turn around in the direction of rotation and taken past the second drum. Thus one wrap is made comprised of a series of one half turns made around both drive drums. The wrapping is what provides the amplification force to convert a tailing force to a drive force. Preferably, 4 wraps are made for tensile members connected to "finger" digits, and 6 for a "wrist" joint. Each wrap provides for slightly less than 2× amplification of the tailing force applied to a tensile member so wrapped.

Each wrap is placed in an unoccupied track of the drive drums as a wrap is made. Each wrap has a segment of the tensile member extending between the drive drums being unsupported for the span therebetween.

Elastic members are attached to each wrap of each tensile member. The elastic members are fixed to the tensile member at a point intermediate the unsupported span between the drive drums along one side. Preferably, the elastic members are coupled closer to one of the drive drums to optimize the stroke length of the load. The reader will appreciate that the draw of a tensile member is on the same order of magnitude as the stroke length. To help prevent the elastic member from wrapping about a drum, the attachment point is made so that during a stroke, the attachment point moves toward the other drive drum.

The elastic members bias the tensile member against the tailing force in a manner to permit the digit to move towards and to the open and extended position upon diminishment of the tailing force. The use of the elastic members permits immediate response of the digit towards and to an open position upon this reduction of the tailing force. The elastic members also maintain the wraps within their preselected tracks during successive manipulations of the digits which prevents entanglement.

In operation, the drive drums rotate at a constant speed. The periphery of the drive drums move at a linear speed directly proportional to the radius of the drums. In the steady state condition when no manipulations of digits are desired, the stepper motor does not alter the tailing force, therefore the tensile members do not move and the drive drums slip relative to the tensile members. When it is desired to close and contract a digit, the stepper motor coupled to the tensile member threaded to the digit is operated to apply a tailing force to the tensile member. The tailing force is amplified by the capstan drive and draws the tensile member in, which opposes the normal biasing force of the digit. The digit contracts an amount determined by the stepper motor. The tensile member is drawn in at a rate equal to or less than the linear speed of the drive drums. The elastic members do not appreciably reduce the operating force of the capstan drive when they are being extended during the closing and contraction of the digit.

When it is desired to open and extend the digit, the tailing force is reduced a specified amount. The reduced tailing force is transmitted to the tensile member via a reduced operating force. The reduced operating force permits the digit to returned towards and to the open and extended position. The biasing means of the digit is not sufficient generally to overcome the self-tailing force of the multiple wraps of the tensile member, therefore the digit will not open and extend without the assistance of the elastic members to urge the tensile members against the self-tailing forces. The elastic members therefore allow the digit to immediately open and extend when the tailing force is diminished, and they also maintain the tensile members in their tracks.

OTHER OBJECTS AND ADVANTAGES

An object of this invention is to provide an improved capstan winch which can provide adequate amplification of a tailing force while providing controllable and responsive relaxation of a tensile member upon diminishment of an applied tailing force.

An advantage of this apparatus is greater power applied to a load through use of the winch while maintaining control of the release of tensile loading of the load.

Another object of the present invention is the use of a single capstan drive apparatus to control a plurality of tensile members coupled to independent loads. Each of the loads must be able to have independent tensile forces of varying magnitudes applied independently to the loads and permit release of tensile force from one load while permitting tensile forces to be continuously applied or increased to the other loads. The prior art solution of reversing the drive drums would affect all tensile members manipulated by a single drive apparatus.

An advantage of this apparatus would permit efficient economical use of a capstan drive to permit a plurality of tensile members to be controlled through use of a single drive. This is especially true in robotics which has a great number of tensile members to be manipulated relatively simultaneously. Such an apparatus would permit an entire appendage, such as an analog of a human hand, to be controlled by a single winch assembly.

A further object of the improved capstan drive is to provide a relatively quiet and accurate driving apparatus for use in automation. This capstan drive would be substituted for other driving apparatuses (such as pneumatic cylinders), used in automatic manufacturing processes, for example.

An advantage of this drive would be quieter operation in a manufacturing plant with the attendant well-known benefits to employees and productivity.

Another advantage would be that accurate positioning of automated members, eliminating some of the position control circuitry used therewith, may be made.

Another object of the present invention is to provide an apparatus which may provide for accurate simulation of the movements of a human hand. The simulation of the human hand would have sufficient power to operate while maintaining immediate response to a relaxation of a tensile force controlling a particular articulated appendage.

An advantage of this apparatus in the use of robotics is readily appreciated. The hand could grasp an object with sufficient power to hold it by application of a relatively small but significantly amplified tailing force and immediately release the object grasped when desired.

Another advantage of such a device would be application to communication techniques as a communication tool to permit non-signers to "converse" with the deaf-blind by fingerspelling.

BRIEF DESCRIPTION OF THE DRAWINGS

Other objects, features and advantages of this invention will be more apparent after referring to the specification and attached drawings in which:

FIG. 1 is a perspective view showing a double capstan drive apparatus embodying the present invention being used to manipulate a multiply articulated plurality digit human hand analog wherein a tensile member from each digit has four or more wraps around a capstan drive to a separate motor and having elastic biasing members attached mid-span between the drive drums in a direction against a tailing force supplied by the stepper motor;

FIG. 2 is a schematic view showing the manipulation of a single digit by a single tensile member through use of an apparatus embodying the present invention, and FIG. 3 is a perspective view showing a preferred method of providing a plurality of tracks in drive drums used in the present invention.

DETAILED DESCRIPTION OF THE PREFERRED EMBODIMENT

FIG. 1 illustrates an overall view of a specific embodiment of an improved double capstan drive 10 according to the invention being used to drive a human hand analog 12 comprised of a plurality of digits 14 such that true replication and simulation of the human hand analog 12 corresponds with human hand movement.

Further reference to FIG. 1 will be made to explain how one embodiment of an improved capstan drive 10 according to the present invention may be made. As noted above, the human hand analog 12 has a plurality of articulated digits 14 which are to be manipulated by the improved drive device 10. Each digit 14 is normally biased in an open and extended position by means of a spring 16. Each articulated digit 14 has a tensile member 20 threaded to it. Thus, the reader will understand that there are as many tensile members 20 as digits 14 or independent joints (such as a wrist, not shown) to be manipulated.

The plurality of tensile members 20 are coupled to their respective digits 14 in a manner sufficient to cause the articulated digit to move to a second position, namely a closed and contracted position, by application of a tensile force on a tensile member 20. Upon release of the tensile force from a tensile member 20, the spring 16 operates to apply a biasing force to return the digit 14 to its first position, that is the open and extended position.

The improved capstan drive 10 has two substantially parallel, continuously rotating, drive drums 22 and 24. The manner in which the drive drums are driven is well known in the art and will not be further disclosed herein. Upon the periphery of each drive drum 22 and 24, a plurality of substantially parallel tracks 26 are provided.

By additional reference to FIG. 3, it is seen that a preferred method of providing the plurality of tracks 26 is the application of a series of "C" rings 27 coupled to drive drums 22 and 24. "C" rings 27 have external channels 26 provided to accept tensile member 20 and to form tracks 26. "C" ring 27 has a "diameter" slightly greater than a diameter of drive drum 22 and 24. Due to a slit 28 in "C" ring 27, "C" ring 27 is permitted to clamp drive drum 22 or 24 under application of tension force in tensile member 20 and thereby transfer force from drive drum 22 or 24 to tensile member 20.

"C" ring 27 must be sufficiently resilient to "release" from drive drum 22 or 24 when tensile loading of tensile member 20 is removed and to grip drive drum 22 or 24 upon application of tensile force. Additionally, the coefficient of friction, when clamping, must provide sufficient amplification to the tensile member. A suitable material for "C" ring 27, in the present application is Delrin ™ AF, registered trademark of E. I. DuPont De Nemours and Company However, the reader will understand that tracks 26 may be otherwise provided on drive drums 22 and 24, such as by machining directly into the drive drum.

Stepper motors 30 are provided to apply a tailing force to individual tensile members 20. The tailing force is amplified by the double capstan drive arrangement to provide a sufficient tensile force to enable a digit 14 to which the tensile member 20 is coupled to be moved and manipulated to a second position which is closed and contracted. The reader will of course appreciate that other devices which may apply a tailing force may be substituted in lieu of the stepper motors 30. Merely by way of example only and not to be construed as any limitation, it is contemplated that wide-ranging devices may be substituted for the stepper motors 30. A few examples of such devices are bimetallic junctions, solenoids, servo mechanisms such as pneumatic and mechanical devices, pendula, or some combination thereof, or any other device which may apply a tensile force to an end of a tensile member 20.

The path which a tensile member 20 takes from a digit 14 to which it is threaded to a stepper motor 30 is accomplished in a very specific fashion. A tensile member 20 from an articulated digit 14 is directed to the double capstan drive arrangement in a substantially perpendicular manner by use of a pulley 32. The tensile member is taken from the pulley 32 past a first drive drum 22 and wrapped one-half turn in the direction of rotation around drive drum 24 and returned to the first drive drum 22. At drive drum 22 the tensile member is again wrapped one-half turn in the direction of rotation and taken past drive drum 24 to complete one wrap of the capstan drive drum assembly. Typically multiple wraps are provided around the drive drum assembly before the tensile member 20 is taken to a stepper motor which will provide the tailing force. As will be appreciated, the number of wraps determines the amount of amplification to be provided by the tailing force to the tensile member 20. Therefore, depending upon the amount of force one wishes to apply to a tensile member 20, one may have repeated wraps about the drive drum. In a preferred embodiment, it is preferred to have four wraps for tensile members threaded to articulated digits representative of human fingers and to use six wraps for tensile members coupled to a hand analog 12 to manipulate a wrist joint (not shown).

As is readily appreciated, each drive drum 22 and 24 is separated from one another by a distance equal to at least one diameter. The spacing between the drive drums 22 and 24 provides a segment 34 of each tensile member 20 extending between the drive drums 22 and 24 forming the segment 34 across the unsupported span. The separation is important to the stroke length of the load to be moved. There will be one segment 34 on each side of the capstan drive assembly for each wrap which a tensile member 20 makes around the drive drums 22 and 24. That is, for finger digits 14, there will be five segments 34 along the top portion of the capstan drive assembly and four segments 34 along the bottom portion of the capstan drive assembly due to the nature and manner in which the tensile member 20 is wrapped. As each tensile member 20 is wrapped about the drive drums 22 and 24, the tensile member 20 is placed in an otherwise unoccupied peripheral track 26 to help prevent portions of a tensile member 20 from becoming entangled.

A plurality of elastic members 40 are coupled to each tensile member 20 intermediate each segment 34. The coupling is provided towards one end of the segment 34 near drum 22 such that the elastic member continuously biases the tensile member 20 in a direction opposed to the tailing force provided by stepper motor 30 and optimizes the stroke length without having elastic member 40 wrap around a drive drum 24. It being undesired to have elastic member 40 wrap around drum 24 when a load is drawn, a practical limit to the draw is the separation of the drive drums. Elastic members 40 also provide continuous biasing which helps ensure that a portion of tensile member 20 remain in a track 26.

The operation of an improved capstan drive 10 embodying the present invention will now be described by reference to FIG. 2. FIG. 2 shows a single digit 14 of the human hand analog 12 (not shown) being manipulated by a device of the present invention. An articulated digit 14 is shown in a steady state condition in an extended and open position. Spring members 16 continuously bias the digit 14 into the first position. That is, in the absence of a tensile force on tensile member 20, spring member 16 returns the digit 14 to the first position. Tensile member 20 is shown being threaded to the first digit 14 and wrapped four times about the capstan drive arrangement and taken to a stepper motor 30 as described above. With the stepper motor not operating to change the tailing force applied to the tensile members 20, the digit 14 should not move.

As is known in the prior art, the continuously rotating drive drums 22 and 24 slip relative to the tensile member wrapped thereabouts without any change in the tailing force provided by the stepper motor 30. It is appreciated that just by the weight of the tensile member 20 and natural frictional forces existing between the tensile member 20 and the rotating drive drums 22 and 24, a self-tailing force is created which tends to drive the articulated digit 14 to a second position which is a closed and contracted position against this force supplied by the spring member 16. The self-tailing force is countered to a certain extent by spring member 16 and more so by the elastic members 40 coupled to the tensile member segment 34.

When the stepper motor 30 applies a tailing force to an end of the tensile member 20, the capstan drive arrangement drives the digit 14 towards the second position, as is known in the art. The tailing force continues to hold the digit 14 in the new position until it is desired to have the digit 14 move to a new position. When it is desired that digit 14 should be returned to the first position, which is the open and extended position, the tailing force provided by stepper motor 30 is diminished. In prior art systems having more than three wraps, it would generally be difficult to release tensile member 20 from the capstan drive arrangement due to the self-tailing force and permit articulated digit 14 to open and extend. This is especially true in the present embodiment in that spring member 16 cannot supply a large biasing force to return the digit to the open position. Therefore, unless the drive drums 22 and 24 were reversed, the articulated digit 14 would remain in place or may slowly move further towards the second position or first position.

However, by use of the elastic members 40 coupled to the midpoint of each tensile member segment 34, upon diminishment of the tailing force by the stepper motor 30, the tensile member 20 is immediately released from the capstan drive arrangement which permits the articulated digit 14 to immediately respond by opening and extending as desired. Additionally, the elastic members 40 continuously apply a force to the tensile member 20 and maintain the tensile member 20 wraps within the tracks 26. The same biasing force supplied by the elastic members 40 is sufficient to keep the various wraps of the tensile member 20 from becoming entangled and enmeshed in one another upon release of the tensile member 20 by the stepper motor 30.

Even though not shown in FIG. 2, multiple tensile members 20 may be wrapped about the drive drums 22 and 24 and taken to independent stepper motors 30. Therefore, reversal of the drive drums 22 and 24 would be detrimental to operation of the device in that upon reversal of the drive drums 22 and 24, all the tensile members 20 coupled to the drive drum apparatus would be released.

However, it is noted that with the current device, multiple tensile members 20 may be manipulated by independent stepper motors 30 coupled to the tensile members 20 without effect from one tensile member 20 to another.

In summary, the invention provides an improved capstan drive which provides for independent manipulation of a plurality of tensile members being driven by the capstan drive arrangement. The operation of the capstan drive is further improved in that greater amplification of a tailing force is permissible by use of a device embodying the present invention due to the use of the elastic members 40 to overcome a self-tailing force and to maintain the wraps within the tracks of the drive drums 22 and 24. Thus, independent and powerful operation and manipulation of a plurality of digits 14 of a human hand analog 12 (not shown) is possible by use of the improved capstan drive as herein disclosed.

While the above provides a full and complete disclosure of the preferred embodiment of the present invention, various modifications, alternate constructions, and equivalents will occur to those skilled in the art given the benefit of this disclosure. Thus, the invention is not limited to the specific embodiment described herein, but is defined by the appended claims.

What is claimed is:

1. An improved capstan drive apparatus for use in robotics in manipulating an articulated appendage, comprising:
   a first and a second continuously rotatable drum;
   an articulated member biased in a first position by a biasing structure;
   means for generating a tailing force;
   a tensile member coupled to said articulated member and to said generating means for communicating said tailing force to said articulated member to move said articulated member to a second position;
   said tensile member including a plurality of wraps around said first and second drum, said tensile member having a span between said drums for each said wrap; and
   means, coupled to said tensile member at a point towards the center of said span, for biasing said tensile member in opposition to said tailing force, assisting said biasing structure to move said articulated member to said first position.

2. An improved capstan drive apparatus as claimed in claim 1, further comprising:
   a second means for generating a second tailing force;
   said articulated member having a second articulated member biased in a third position by a biasing structure;
   a second tensile member coupled to said second articulated member and to said second generating means for communicating said second tailing force to said second articulated member to move said second member to a fourth position, said second tensile member including a plurality of wraps around said first and second drum;
   said second tensile member having a span between said drums for each said wrap; and
   a second means, coupled to said second tensile member at an intermediate point a span of said second tensile member, for biasing said second tensile member in opposition to said second tailing force, assisting said biasing structure to move said second articulated member to said third position.

3. An improved capstan drive apparatus as claimed in claim 2, further comprising:
   a plurality of biasing members coupled to said plurality of wraps at each said span of said first and second tensile members for biasing said first and said second tensile members.

4. An apparatus for simulating movement of a human appendage, comprising:
   an articulated appendage having an operable joint;

first means, coupled to said joint, for biasing said joint to a first position;

a first and a second continuously rotatable capstan drive drum;

means for generating a tailing force;

a tensile member, a first end of said tensile member coupled to said joint to oppose said first biasing means, and a second end of said tensile member coupled to said generating means;

said tensile member wrapped repeatedly around said first drive drum and said second drive drum such that a plurality of wraps of said drive drums is made, said tensile member having a span extending between said drive drums for each said wrap; and a second means, coupled to said tensile member at an intermediate point of each said span between said drive drums, for biasing said tensile member to said first position, such that when a tensile force of said generating means is relaxed from said tensile member, said second biasing means releases said tensile member from said capstan drive assisting said joint of said appendage to return to said first position while said capstan drive drums rotate.

5. An apparatus for simulating movement of a human appendage as claimed in claim 4, further comprising:

a second means for generating a second tailing force;

said articulated human appendage having a second operable joint biased to a third position by a biasing structure;

a second tensile member;

a first end of said second tensile member coupled to said second joint to oppose said biasing of said second joint and to move said second joint to a fourth position, and a second end of said second tensile member coupled to said second generating means;

said second tensile member wrapped repeatedly around said first drive drum and said second drive drum such that a plurality of wraps of said drive drums is made, said second tensile member having a span extending between said drive drums for each said wrap; and second means, coupled to said second tensile member at an intermediate point of a span between said drive drums of said second tensile member, for biasing said second tensile member in opposition to said second tailing force, assisting said biasing structure to move.

6. An apparatus for simulating movement of a human appendage as claimed in claim 4, wherein said second biasing means comprises a plurality of elastic members coupled to said plurality of wraps at said spans of said tensile member.

7. A process for applying a tensile force to a load biased in a first position by a biasing structure, comprising the steps of:

providing a first and a second continuously rotatable drive drum;

providing a tensile member having a first end coupled to the load, said tensile member wrapped repeatedly around said drive drums, such that a segment of said tensile member has a span extending from said first drive drum to said second drive drum for each wrap of said tensile member about said drive drums with a second end of said tensile member coupled to means for generating a tailing force to said tensile member, such that a tailing force applied to said second end of said tensile member will be amplified by said capstan drive drums and apply a tensile force to said load in opposition to the biasing force; and continuously biasing said tensile member by application of a biasing force to said tensile member in opposition to said tailing force, assisting the biasing structure to move said load to the first position when said drive drums are rotating.

8. A process for applying a tensile force as claimed in claim 7, wherein said continuously biasing step comprises:

continuously biasing each segment of said tensile member at a point intermediate to said drive drums.

9. A process for simulating movement of a human appendage, comprising the steps of:

providing an appendage having an articulated member biased to a first position by use of a biasing structure;

providing a first and a second continuously rotatable capstan drive;

providing a first end of a tensile member coupled to said articulated member in a manner to move said member to a second position, said tensile member wrapped repeatedly around said first and second capstan drive drums wherein for each wrap of said tensile member a segment of said tensile member extends across a span between said first and second drive drums with a second end of said tensile member coupled to a means for generating a tailing force; and biasing continuously each said segment of said tensile member at midspan by application of a biasing force to said tensile member in opposition to said tailing force while said drive drums rotate.

10. A process for simulating movement of a multiple articulated analog of a human appendage, comprising the steps of:

providing a plurality of articulated members for the multiple articulated human appendage analog biased to a first position;

providing a first and a second continuously rotatable capstan drive drum providing a tensile member coupled to each articulated member in opposition to said biasing of said articulated member, each said tensile member wrapped repeatedly around said capstan drive drums such that a plurality of wraps of said drive drums is made by each said tensile member wherein each wrap of each said tensile member has a segment extending across a span between said first and second drive drums, with a second end of each said tensile member coupled to a means for generating independent tailing forces to each tensile member; and biasing continuously each said tensile member by application of biasing force to each said tensile member in opposition to each of said independent tailing forces while said drive drums rotate.

11. An improved capstan drive, comprising:

a first and a second continuously rotatable drive drum;

means for applying a first tailing force;

means for applying a second tailing force;

a first tensile member having a plurality of wraps about said drums from a first load to said first tailing force applying means;

a second tensile member having a plurality of wraps about said drums from a second load to said second tailing force applying means;

means, coupled to said first tensile member, for assisting said first tensile member to move in opposition to said first tailing force towards said first load when said drive drums are rotating; and means, coupled to said second tensile member, for assisting said second tensile member to move in opposition to said second tailing force towards said second load when said drive drums are rotating.

12. The improved capstan drive of claim 11 wherein said first and second assisting means are coupled to said plurality of wraps of said first and second tensile members.

13. A method of relaxing a tensile member moving a biased load from a first position to a second position by amplification of a tailing force applied to an end of the tensile member having a plurality of wraps around a first and a second continuously rotatable drive drum when the tailing force is relaxed, comprising the step of:

biasing, when the drive drums are rotating, the tensile member by application of a biasing force in opposition to the tailing force to assist a biasing structure coupled to the load to move the load towards the first position when the tailing force is relaxed.

14. An improved capstan drive, comprising:

a first and a second continuously rotatable drive drum;

means for applying a first tailing force;

means for applying a second tailing force;

a first tensile member having a plurality of wraps about said drums from a first load to said first tailing force applying means;

a second tensile member having a plurality of wraps about said drums from a second load to said second tailing force applying means;

a first biasing member coupled to said first tensile member intermediate to said first load and said first tailing force applying means to bias said first tensile member in opposition to said first tailing force; and a second biasing member coupled to said second tensile member intermediate to said second load and said second tailing force applying means to bias said second tensile member in opposition to said second tailing force.

15. An improved capstan drive, comprising:

a first and a second continuously rotatable drive drums;

means for applying a tailing force;

a tensile member having a plurality of wraps about said drums from a load to said applying means; and a plurality of biasing members coupled to said plurality of wraps of said tensile member intermediate to said load and said applying means to bias said tensile member in opposition to said tailing force.

* * * * *